United States Patent
Sharp et al.

(10) Patent No.: US 10,764,223 B2
(45) Date of Patent: Sep. 1, 2020

(54) SYSTEM AND METHOD FOR GENERATING AND APPLYING MESSAGE TEMPLATES BASED ON MACHINE GENERATED MESSAGES

(71) Applicant: OATH INC., New York, NY (US)

(72) Inventors: Doug Sharp, San Francisco, CA (US); Varun Bhagwan, San Jose, CA (US); Yoelle Maarek, Haifa (IL)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/417,971

(22) Filed: May 21, 2019

(65) Prior Publication Data

US 2019/0273710 A1    Sep. 5, 2019

Related U.S. Application Data

(63) Continuation of application No. 14/524,460, filed on Oct. 27, 2014, now Pat. No. 10,348,667.

(51) Int. Cl.
*H04L 12/58* (2006.01)

(52) U.S. Cl.
CPC .............. *H04L 51/22* (2013.01); *H04L 51/12* (2013.01); *H04L 51/24* (2013.01)

(58) Field of Classification Search
CPC .......... H04L 51/22; H04L 51/12; H04L 51/24
USPC ....................................................... 709/226
See application file for complete search history.

(56) References Cited

U.S. PATENT DOCUMENTS

| | | | |
|---|---|---|---|
| 6,286,043 B1* | 9/2001 | Cuomo | H04L 67/30 709/217 |
| 7,496,634 B1 | 2/2009 | Cooley | |
| 7,903,793 B2* | 3/2011 | Visser | H04L 12/66 379/88.01 |
| 2004/0047508 A1* | 3/2004 | Anisimovich | G06K 9/6255 382/218 |
| 2005/0027781 A1* | 2/2005 | Curry | G06Q 10/107 709/200 |
| 2008/0235261 A1* | 9/2008 | Malek | G06F 16/958 |
| 2008/0288322 A1* | 11/2008 | Kennedy | G06Q 10/06 705/7.15 |
| 2008/0301235 A1 | 12/2008 | Mankiewicz | |
| 2009/0307313 A1 | 12/2009 | Wang et al. | |
| 2012/0054135 A1 | 3/2012 | Salaka et al. | |
| 2013/0054613 A1 | 2/2013 | Bishop | |

(Continued)

*Primary Examiner* — David P Zarka
(74) *Attorney, Agent, or Firm* — James J. DeCarlo; Greenberg Traurig, LLP

(57) ABSTRACT

Disclosed is a system and method for email management that leverages information derived from automatically generated messages in order to identify types of messages and message content. The disclosed systems and methods apply the information learned from decoding previously received messages to other messages in a user's inbox to fully, or at least partially decode the information included within such messages. The disclosed systems and methods analyze messages received in a user's inbox to detect message specific information corresponding to types of content in the message and the location of such content in the messages. The message specific information is then applied to other newly received or identified messages to learn message specific information about those messages. Based on such learning, information can be extracted from such messages in order to increase a user's experience and increase monetization.

16 Claims, 8 Drawing Sheets

(56) References Cited

U.S. PATENT DOCUMENTS

| | | |
|---|---|---|
| 2013/0191759 A1 | 7/2013 | Bhogal et al. |
| 2013/0263091 A1* | 10/2013 | Neogi ................... G06F 9/5061 717/126 |
| 2014/0143835 A1* | 5/2014 | Brennan ............... G06F 40/114 726/4 |
| 2015/0019305 A1* | 1/2015 | Gorawala .............. G06Q 10/10 705/14.4 |
| 2015/0073895 A1 | 3/2015 | Karnin et al. |
| 2015/0195224 A1 | 7/2015 | Karnin et al. |

* cited by examiner

FIG. 6    600

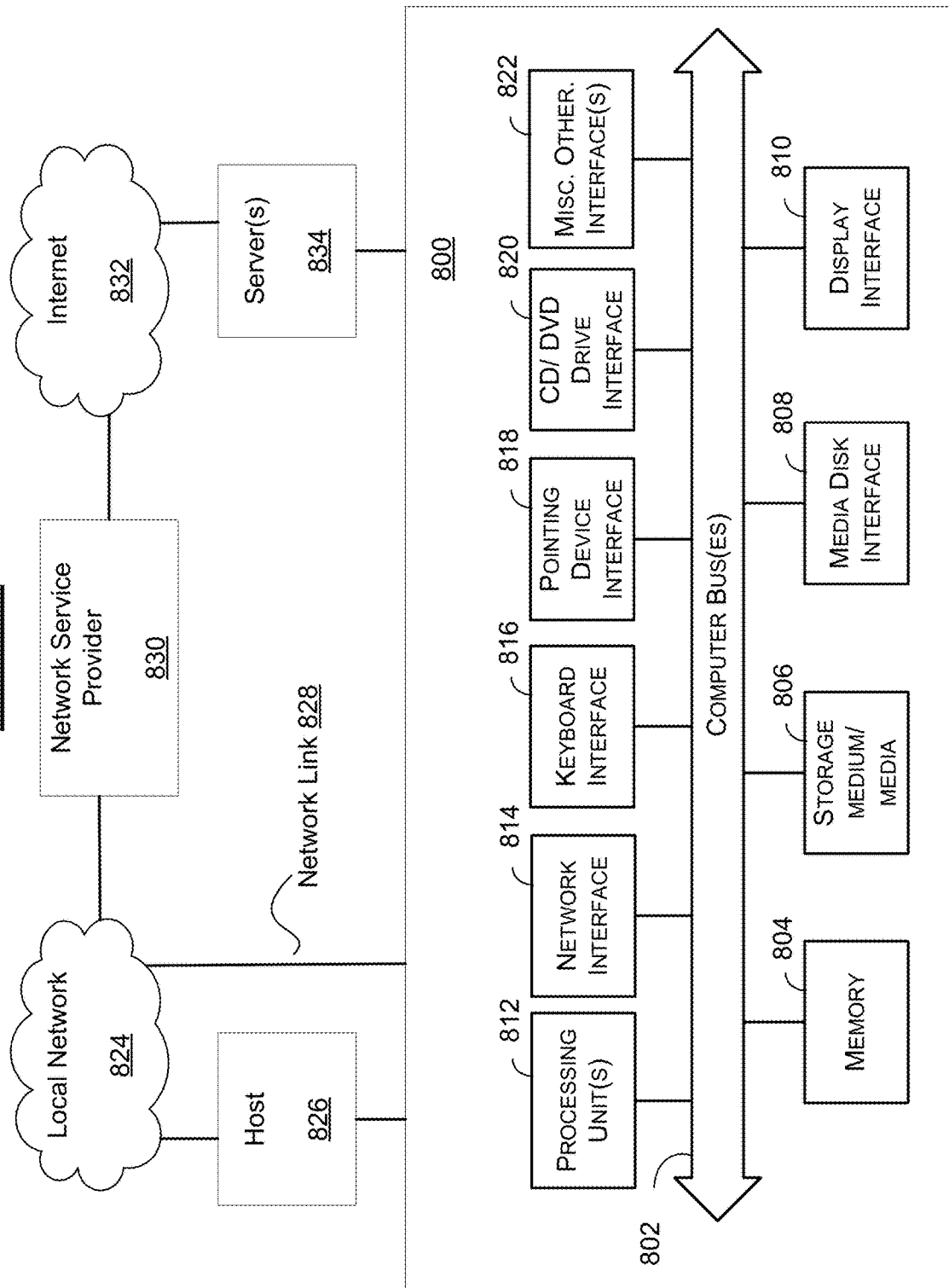

SYSTEM AND METHOD FOR GENERATING AND APPLYING MESSAGE TEMPLATES BASED ON MACHINE GENERATED MESSAGES

CROSS REFERENCE TO RELATED APPLICATION

This application is a continuation of, and claims priority from, U.S. patent application Ser. No. 14/524,460, filed on Oct. 27, 2014, which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to email management, and more particularly towards systems and methods for detecting consistent information in machine generated messages, and applying such information to other messages to increase a user's experience and provide targeted advertising.

RELATED ART

Electronic mail ("email") usage has become ubiquitous for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, current and customers, and the like. Commercial senders or merchants send many of the messages that users receive in their e-mail accounts. These messages include advertisements, promotions, coupons, purchase confirmations, royalty program messages, institution employee announcements, school notifications and the like. The majority of these messages are machine generated emails originating from a template, or boilerplate. Examples of such templates include textual templates and/or HyperText Markup Language (HTML) templates.

SUMMARY

The present disclosure describes systems and methods for email management that leverages information derived from automatically generated messages in order to identify types of messages and message content. That is, the disclosed systems and methods apply the information learned from decoding previously received messages to other messages, such as newly received messages and existing messages in a user's inbox, in order to fully, or at least partially decode the information included within such messages. The content of a message, the identity of the author of the messages, and the identity of the sender may all have a relationship to the user's level of interest in the message.

According to some embodiments, the disclosed systems and methods analyze messages received in a user's inbox to learn message specific information corresponding to types of content in the message and the location of such content in the message. The message specific information is then applied to other newly received or identified messages to learn message specific information about those messages. Based on such learning, information can be extracted from such messages in order to increase a user's experience and increase monetization opportunities.

In accordance with one or more embodiments, a method is disclosed which includes analyzing, via a computing device, a first message associated with an inbox of a user to identify message data of the first message; comparing, via the computing device, the message data of the first message with message data of known message templates associated with the user inbox, the message data of each known message template comprising information associated with a message layout; determining, via the computing device, that the first message is an unknown message based on the comparison, the determination comprising identifying that the first message is not associated with any known message templates; parsing, via the computing device, the first message to determine a type of the first message; identifying, via the computing device, a first message template from the known message templates associated with the user inbox having a type corresponding to the determined type of the first message, the first message template comprising a first message layout; and applying, via the computing device, the first message template to the first message, the application comprising extracting message content from the first message based on the first message layout.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for detecting consistent information in machine generated messages, and applying such information to other messages to increase a user's experience and provide targeted advertising.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 8 is a block diagram illustrating architecture of a hardware device in accordance with one or more embodiments of the present disclosure.

DESCRIPTION OF EMBODIMENTS

Figure 1:
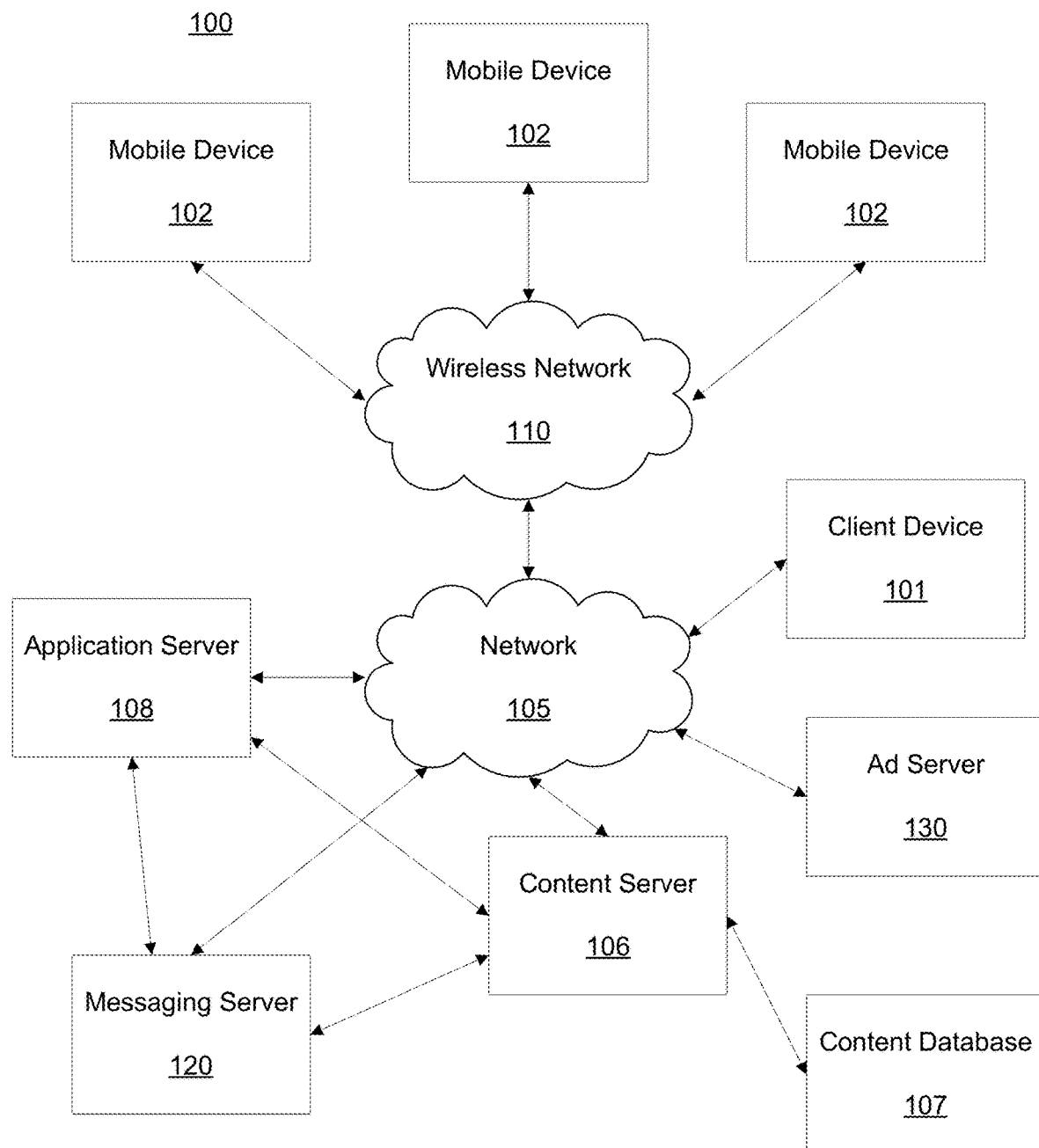
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer (e.g., smart watch), an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Modern active email users receive a large number of messages that were generated by automatic or machine generated processes. These types of messages include, for example, password change emails, purchase confirmations, social notifications, advertisements, promotions, coupons, bills, royalty program messages, institution announcements, news feeds and the like. In fact, it is estimated that currently more than 90% of email traffic is machine generated. Each of these machine generated messages originates through the use of a boilerplate or template during the generation of the messages. These processes typically enable email senders, such as merchants, business entities, service providers and the like, to utilize a message template for creating content, specifically, email messages. Such templates may include one or more variable fields, which specify particular data types. Generally, when messages are created using templates, each variable field may be replaced with one or more data values related to the message content of a particular data type.

Typically, there are two types of email templates: global templates and site-specific templates. An email template generally has the following properties:

| | |
|---|---|
| Display name | The name of the template displayed in the user interface. |
| Code name | The name of the template used in code. |
| E-mail type | Identifies the type of functionality to which the template is related. This can be used to categorize and filter e-mail templates. |
| From | E-mail address that will be used as the sender (From) address of the e-mail. |
| To | Email address that will be used as the recipient address of the email. |
| Cc | E-mail addresses of copy recipients. |
| Bcc | E-mail addresses of blind copy recipients. These will get a copy of the e-mail, but won't see the addresses of other recipients in the mail. |
| Subject | Subject of the e-mail. |
| HTML version | Defines the content that is used for the template when sending e-mails in HTML format. The preferred format can be selected by the user as part of system set-up or preference indication, for example, by using the Site Manager -> Settings -> System -> E-mails -> E-mail format setting. |
| Plain text version | Plain text version of the e-mail template. |

The presently disclosed systems and methods leverage information derived from automatically generated message templates in order to identify types of messages and message content not only in those messages, but also in other messages in a user's inbox. As discussed in detail below, the disclosed systems and methods apply the information learned from decoding previously received messages to other messages, such as newly received messages or existing messages in a user's inbox, in order to fully, or at least partially decode the information included within such messages. The information can include important content, data and metadata, whether visible or invisible to the sender or recipient. For example, such information can include, but is not limited to, people's names, email addresses, username, phone numbers, addresses (e.g., mailing, billing or shipping), and the like.

Also, content of the message can be related to, but not limited to, items being purchased, the name of a new friend in a social network, a shipment tracking number, an itinerary for a flight, and the like. These types of information can be extracted in order to improve the user experience with email and/or the user's email service/platform, and increase monetization. For example, messages can be analyzed to determine a type of email message, which in turn can be presented to a receiving user within an automatic folder or tag designation, or in a particular manner associated with a type of alert. In embodiments of the present disclosure, the identified and/or extracted data can be used for monetization purposes, where targeted advertisements can be served based upon the data (e.g., content) extracted or identified from such messages.

By way of a non-limiting example, user Bob receives a shipping confirmation email from Company X, which is a machine generated email. The disclosed systems and methods analyze this message and can formulate a message template associated with shipping emails received from Company X. For example, the template can reveal the type of content within the shipping email and the location of such content in the message. Therefore, when Bob receives another shipping conformation email from another sender, e.g., Company Y, such message can be analyzed based on the formulated template. That is, based on the template derived from Company X's message, which indicated the location of specific types of content in Company X's message, Company Y's message can be analyzed to determine related content that message.

For example, the template associated with Company X's determined message template identifies the location of the product information in the message. As such, analysis of Company Y's message based on the same template can reveal the location of the product information in Company Y's message. This information can be utilized for a variety of purposes. For example, it may be utilized to determine that the message is associated with a product purchase whereby the message can be correctly categorized and/or organized in Bob's inbox. In another example, the identification of the product information can also lead to a monetization opportunity, whereby an advertisement can be served to Bob in association with Company Y's email, where the ad is associated with, or based on, the product identified in Company Y's message.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, messaging server 120 and advertising ("ad") server 130.

One embodiment of mobile devices 102-103 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, smart watches, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device s 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the messaging server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision message to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-104. In some embodiments, message applications, such as a Yahoo! Mail® or Yahoo! Messenger®, can be hosted by the application server 108 and/or run on devices as "apps". Thus, the application server 108 can store various types of applications and application related information including application data and user profile information.

In another example, messaging server 120 can host email applications; therefore, the messaging server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
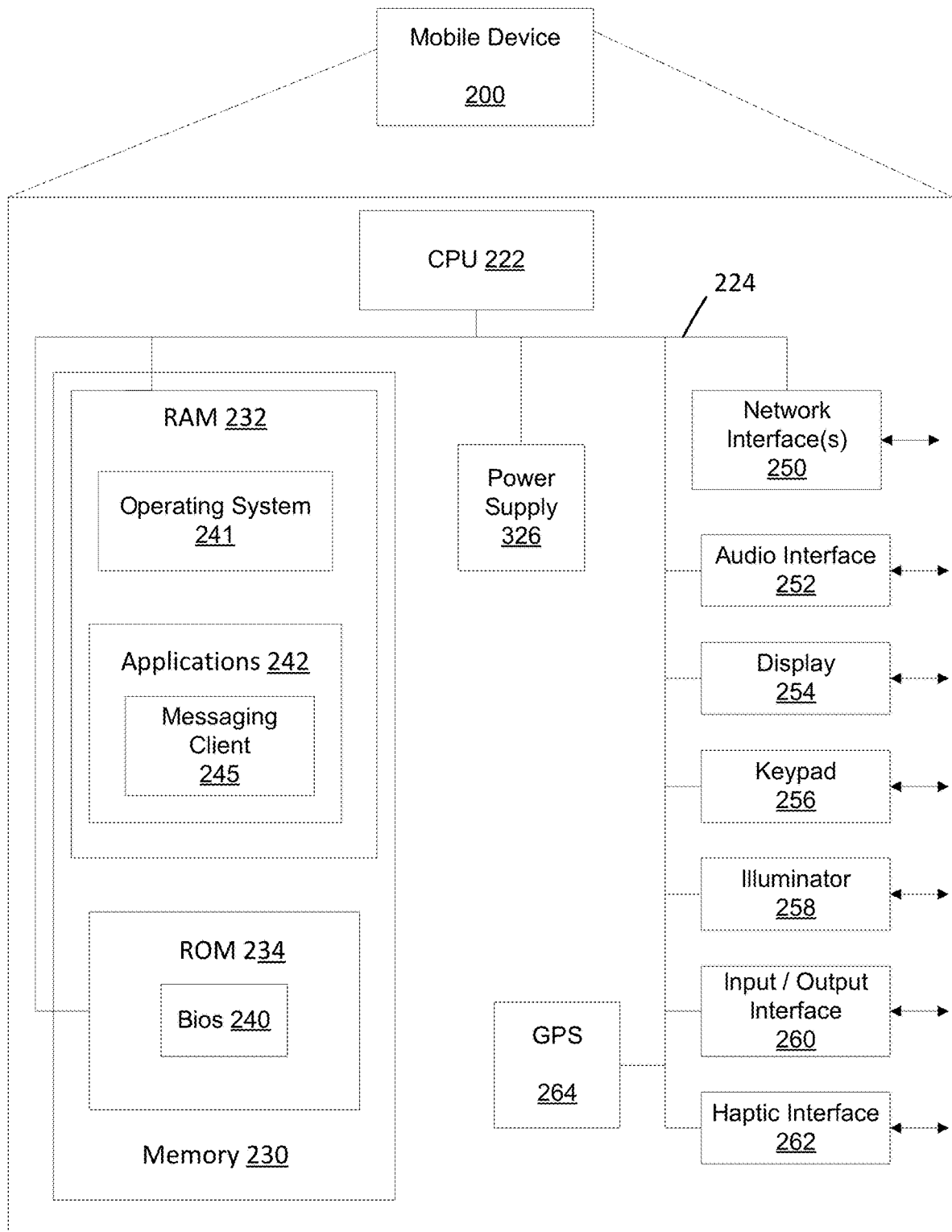
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include email, instant messaging, calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described.

Figure 3:
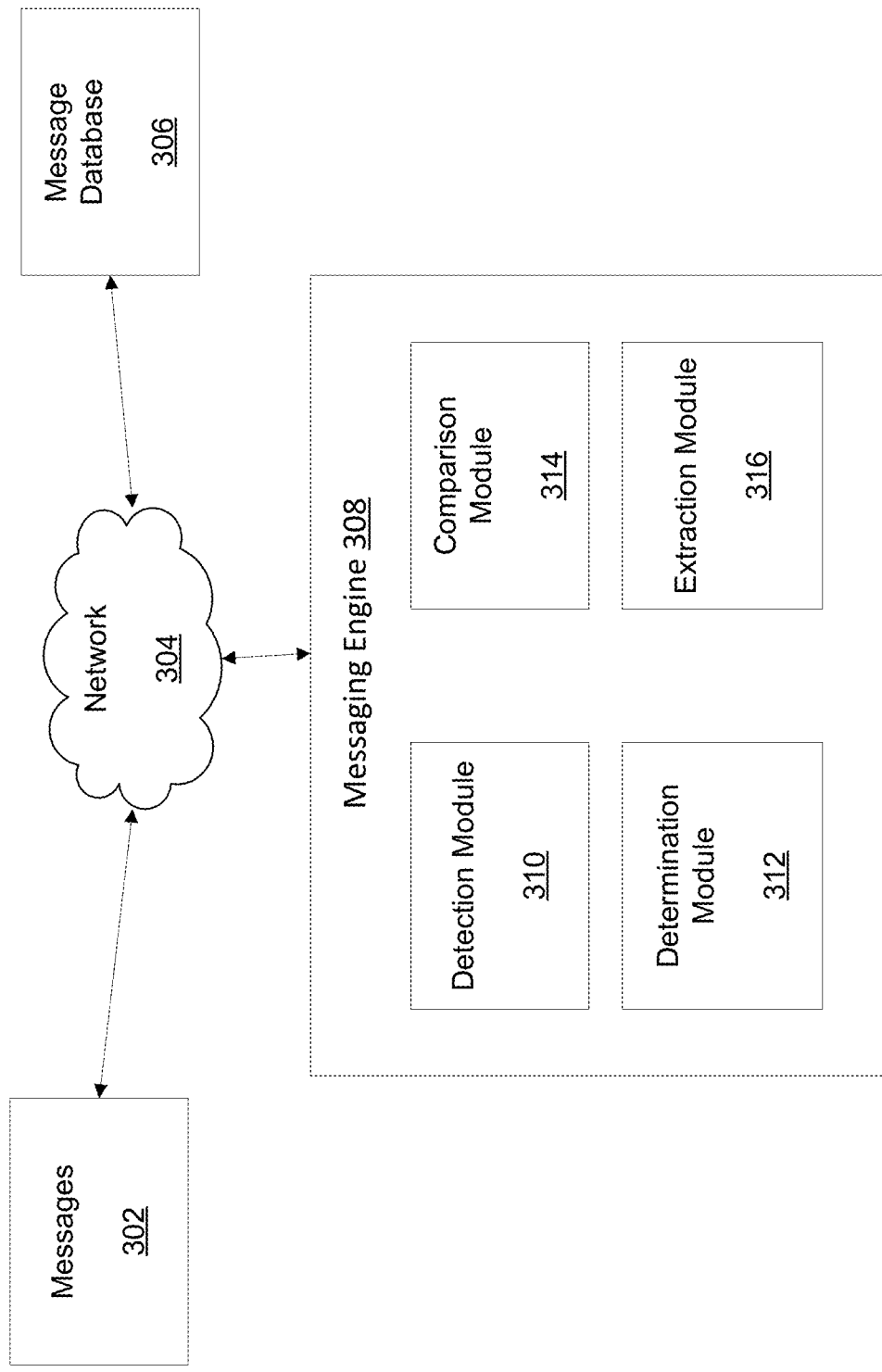
FIG. 3 is a schematic block diagram illustrating components of a system in accordance with embodiments of the present disclosure.

FIG. 3 is a block diagram illustrating the components of system 300 for performing the systems and methods discussed herein. FIG. 3 includes a plurality of messages 302, a network 304, a messaging engine 308 and a database 306 for storing messages. The message engine 308 could be hosted by a web server, content provider, email service provider, ad server, a user's computing device, or any combination thereof. The plurality of messages 302 can be any type of message. Examples of such messages 302 can include HTML forms, email messages, comments to an article or website, online forum posts/entries, word processing documents, help desk messages, portable document format (PDF) documents and/or other types of documents. The messages 302 can be provided to the message engine 308 or accessed by a computer program or device that can access the messages.

In some embodiments, the messages 302 can be stored in a database of stored messages 306, which is associated with an email provider, such as Yahoo! Mail®. The database 306 can be any type of database or memory that can store the messages 302 and associated message template information, as discussed above. For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multi-media Message Service (MMS) messages social networking messages or alerts, and the like) can be received and/or accessed and processed by the message engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

Figure 4:
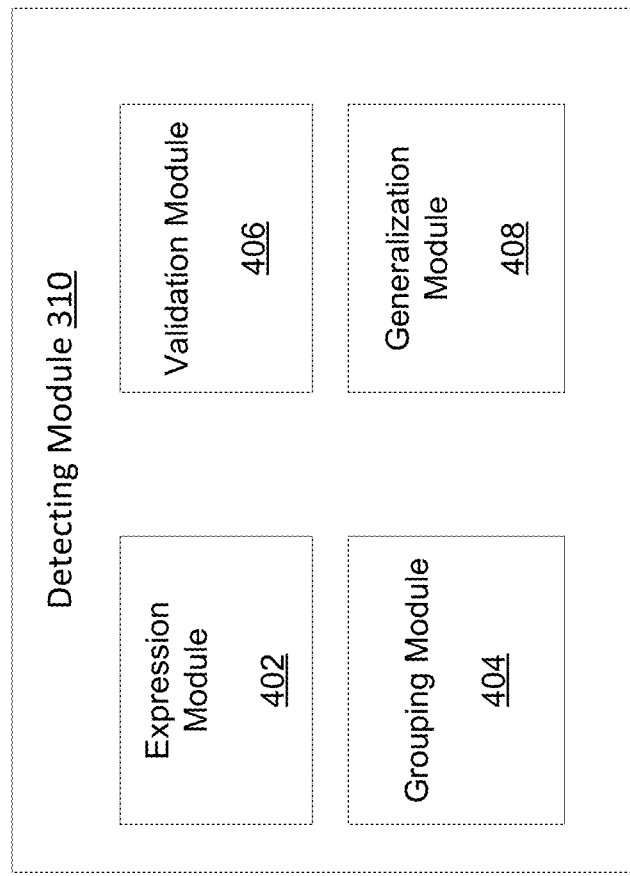
FIG. 4 is a schematic block diagram illustrating components of a system in accordance with embodiments of the present disclosure.

The message engine 308 includes a detection module 310, a determination module 312, a comparison module 314 and an extraction module 316. FIG. 4 is a block diagram illustrating the components of detection module 310 for performing the systems and methods discussed herein. The detection module 310 includes an expression module 402, grouping module 404, validation module 406, and generalization module 408.

It should be understood that the engine(s) and modules discussed herein are non-exhaustive, as additional or fewer engines and/or modules may be applicable to the embodiments of the systems and methods discussed. The operations, configurations and functionalities of the engine and modules identified in FIGS. 3-4, and their role within embodiments of the present disclosure will be discussed with reference to FIGS. 5-6, whereby the components of systems 300 and 400 are implemented to perform the steps and processes of processes 500 and 600.

Figure 5:
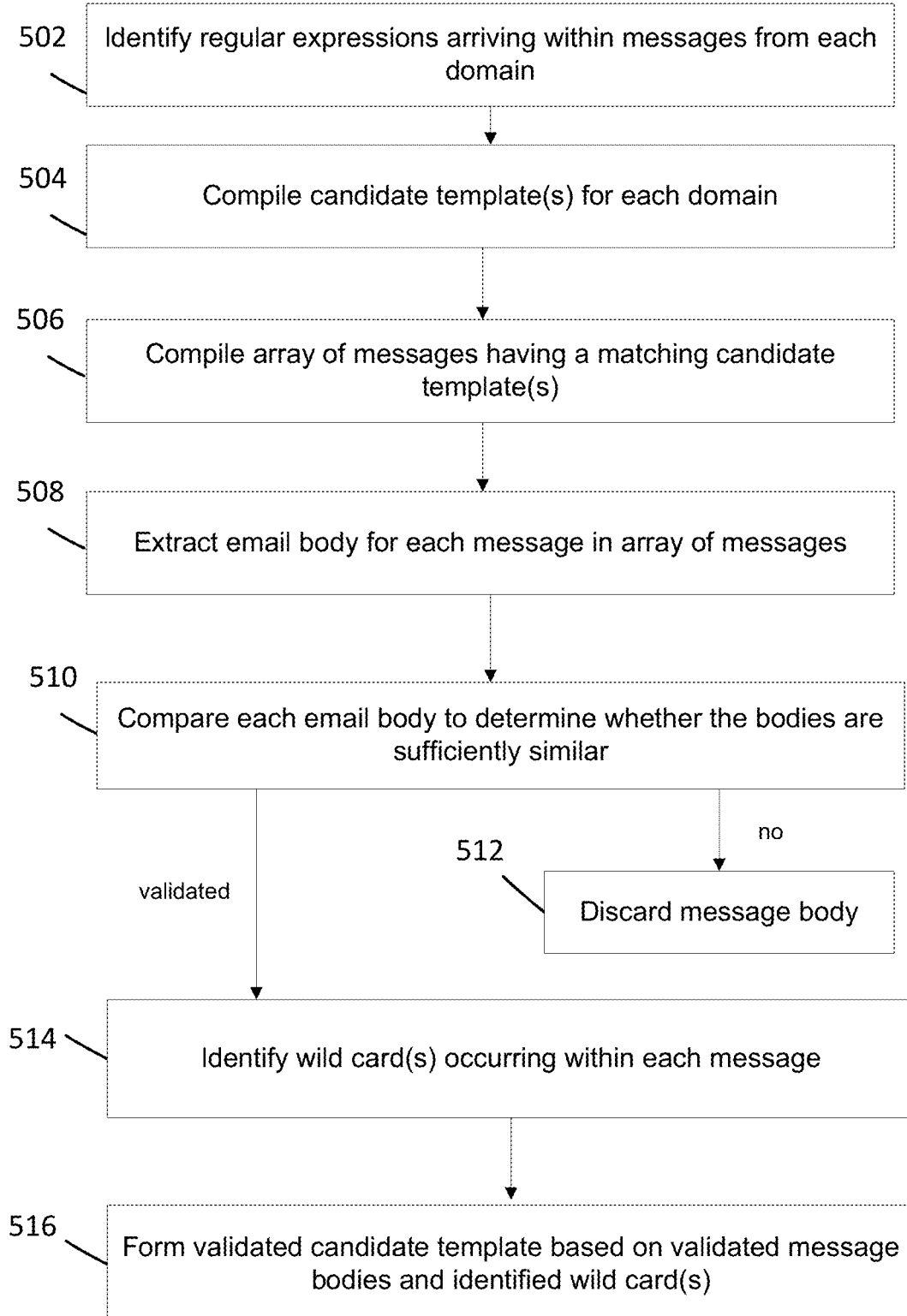
FIG. 5 is a flowchart illustrating steps performed in accordance with some embodiments of the present disclosure.

FIG. 5 is a process 500 diagram illustrating steps performed in accordance with embodiments of the present disclosure. As discussed above, the disclosed systems and methods are based upon the determination of automatically (or machine) generated templates used for sending emails, and based on such determination, extracting important data, information and content from email messages. The systems and methods discussed herein leverage information derived from the identified templates in order to identify types of messages, message structures and message content. The extracted message information is utilized to improve a user's experience with email and/or the user's email service/platform, and increase monetization, as discussed in more detail below. The steps performed by process 500 are performed by the detection module 310, as discussed in more detail below.

In some embodiments, the detection process 500 performed by detection module 310 involves the application of known or to be known algorithms and techniques, and/or machine learning algorithms/techniques that perform the identification of boilerplates in machine generated email based on email content and/or associated information derived from such messages. In some embodiments, the compilation of the information performed by the detection process 500 can be effectuated by any known or to be known machine learning algorithm/technique, whereby the applied detection processes on messages results in bootstrapping. That is, detection bootstrapping can include any known or to be known technique that iteratively or recursively improves the accuracy of the information derived/detected from messaging analysis, as discussed in more detail below.

In Step 502, email traffic is monitored (and analyzed) to identify regular expressions arriving within messages from a given domain. This step is performed by the expression module 402. In some embodiments, such monitoring and identification is performed separately for every domain, as each domain typically employs a certain type of template (or boilerplate). In some embodiments, the steps discussed herein are also applicable to every user. Therefore, embodiments exist where regular expressions arriving from each sender are identified.

Overall, communicated messages over a network are analyzed to identify the sender's identity, generally via a determination of which domain the message is originating from, although other analysis methods can be used. In some embodiments, the monitoring of emails occurs from (or within) a single message platform, e.g., Yahoo! Mail®; and in some embodiments, the monitoring of messages occurs in or across multiple platforms, such as Yahoo! Mail®, Google Mail®, Hotmail®, and other personal and business email platforms, such as Microsoft Outlook®, and the like. This monitoring occurs by analyzing all incoming and outgoing messages from all known (and/or trusted) accounts, and parsing message traffic to identify regular expressions associated with the electronic messages. This monitoring (or identifying) can be performed on all or a subset of user inboxes on a mail system. Such monitoring and/or analysis can be based any known or to be known learning/monitoring techniques and/or algorithms in order to efficiently and properly compile such regular expressions, and/or any data attributes and details related to the messages on a network. According to some embodiments, monitoring can be performed offline and/or online, in order to continuously update and/or build a listing of identified regular expressions, as discussed in more detail below.

As understood by those of skill in the art, a regular expression (often abbreviated as "regex or regexp") is a sequence of characters that forms a pattern. This pattern can be used for pattern matching within strings or string matching, for example, within email messages. Each character in the regular expression is either understood as a metacharacter or a regular character. The regular character is typically understood to carry its literal meaning. The metacharacter is a character that has a special meaning to a computer program such as an email program like Yahoo! Mail®.

In accordance with some embodiments, a regular expression can be a term, word, phrase, address or combination of words and characters or numbers that typically appears in or in association with an email message. In some embodiments, regular expressions also can dictate a pattern or structure of content, such as email templates. Turning back to Step 402, process 400 begins by identifying regular expressions that cover a minimum or selected or fixed percentage of email traffic arriving from each domain. That is, regular expressions that appear or are associated with a percentage of messages above a threshold from a domain are identified. The threshold can be assigned initially and held at a value, or it can be refined over time as more data becomes available to the system and confidence in the accuracy of data increases.

In Step 504, a listing of regular expressions is compiled. This step is performed by the grouping module 404. Specifically, for each regular expression occurring above a threshold for each domain, a listing of such expressions is compiled. These listings are referred to as "candidate templates." In some embodiments, the templates can be compiled and stored as a BLOB (binary large object), as understood by those of skill in the art. As discussed above, such regular expressions involve sequences of characters corresponding to patterns or structures of messages. The candidate templates can provide information corresponding to an email message's layout, the positioning of particular types of content in the message, and other structural email information. In some embodiments, the information can include not only an identifier of the information and a type of the information and message, but also the location of the information in such messages (and templates).

The information can include important content, data and metadata, whether visible or invisible to the sender or recipient. For example, such information can include, but is not limited to, people's names, images associated with a person's messaging account, email addresses, username, phone numbers, addresses (e.g., mailing, billing or shipping), and the like. Also, content of the message can be related to, but not limited to, items being purchased, the name of a new friend in a social network, a shipment tracking number, itinerary for a flight, and the like. As discussed below, the information in the candidate template that is compiled based on the identified regular expressions can denote a type of message. Thus, the candidate template listing represents regular expressions and templates for each domain, the location of the expressions, and the type of data each expression represents, in addition to providing identifying information associated with the template producing process implemented by each domain upon sending an email, as discussed in more detail below.

In Step 506, for each candidate template, an array of email messages is identified. This step is performed by the validation module 406 (either alone or in combination with the grouping module 404). According to some embodiments, for each candidate template associated with a type of message, messages communicated from the domain are analyzed to identify that the regular expressions identified in Step 504 match. That is, the listing of regular expressions is compared against email messages arising from a domain in order to compile an array of messages that correspond to a type of message. For example, expressions related to subject lines in messages can be compared to determine if they are of the same type of message. Thus, an array of messages is compiled for each domain for each candidate template (i.e., each domain's candidate templates).

For example, CNN® has an associated candidate template listing identifying, among other expressions, "daily news" as an expression. Therefore, in Step 506, message traffic from CNN® is analyzed to identify an array of messages having the expression "daily news" in the subject line. In some embodiments, the array of messages includes a predetermined number of messages; however, this can be altered, modified and set by a system administrator, content provider, the system as a whole for accuracy and efficiency, and/or a combination thereof.

According to some embodiments, the comparison in Step 506 can account for the sending domain's size. For smaller domains, or domains that have sent few or a low amount of emails (either over time, daily or periodically), process 500 reviews each email and counts the number of times, and how often (or frequent) an expression appears in a message. If this satisfies a threshold (which can be set by a user, system, content provider, system administrator, or combination thereof, and varied over time), then the array of messages is compiled for that domain, as discussed above.

For larger domains, or domains that send a large amount of emails, in order to avoid overhead, a sample subset of message traffic is utilized. The sample size is a matter of design choice, and may vary over time as more data is collected and confidence in the data is increased. For example the sample size can be large and be made smaller over time. According to some embodiments, should these expressions occur above a threshold which, by way of non-limiting example can be set by a user, system, content provider, system administrator, or combination thereof, and varied over time, then the array of messages is compiled for that domain, as discussed above.

In Step 508, the message bodies of the messages within the array of messages are extracted. This step is performed by the validation module 406. That is, for each message in the array of messages, the structural design, pattern or format (i.e., email template) of each message is extracted. From the above example, the emails matching "daily news" which form the array for the domain CNN® are then analyzed and each email's message format (or message body) is extracted.

In Step 510, each extracted email body is compared against each other to validate (or verify) that each message originates from the same automatic process. That is, each extracted email body's format is compared against another extracted message's format to determine the similarities between each messages format. Should the formats be sufficiently similar, then the format of the email bodies is validated. According to some embodiments, sufficiency of similarity between formats involves each format having a certain number of structural qualities at or above a threshold. This step is performed by a validation module 406.

According to some embodiments, the validation module 406 can employ known or to be known machine learning techniques to identify similarities between emails and their evolving counterparts due to changes and advances in email, communication and security protocols for such messages, new sending domains and/or modified or new templates. Thus, the validation module 406 is initially programmed or trained with a set of valid candidate regular expressions, and as the process 500 compiles the candidate templates, as discussed above, this set of expressions evolves. The validation module 406 then analyzes each message's format (or message body) and based on determined information between each message's body, determines how similar each message is in format. By way of non-limiting example, solely for illustration purposes and not to be construed as limiting in nature regarding the values or characteristics the validation module 406 utilizes to perform the above comparison, the validation module 406 can compare various features for HTML messages including, but not limited to, a determined edit distance between HTML tags, HTML comments, or the content and/or layout of the message itself.

For example, JetBlue® sends emails regarding people's travel itineraries (e.g., flights), where a regular expression for such emails, referred to as a candidate template, includes "Check In for your flight". An array of messages is compiled from message traffic originating from JetBlue® (e.g., @jetblue.com) by identifying messages that have "Check In for your flight" in the subject line. Then, the email bodies of such messages are extracted and compared. The comparison corresponds to the message format or email structure of each message's body.

If the message bodies are sufficiently similar, as discussed above, then the messages are validated. That is, the messages have been confirmed to have originated not only from the same domain, but also via the same automatic process. In other words, the domain utilized the same message template for structuring and drafting the email messages. If the message bodies are not found to be sufficiently similar, then the message body (e.g., template for that message or format) is discarded. Step 512.

In some embodiments, for validated messages, a generalization step occurs next to identify wild cards (or words that change from message to message despite messages having been originated via the same process). In Step 514, the content of each message is then analyzed to determine wild cards occurring in each message. This step is performed by a generalization module 408. This analysis comprises comparing each message's content to identify content that differs within each validated message. Examples of wild cards include, but are not limited to, airport codes, city names, country names, dates, times, sender's names, salutations, recipient's names, greetings, and the like. According to some embodiments, the text of a message is analyzed, and in some embodiments, all of the content is analyzed, accounting for text, audio, video, images, attachments, and the like.

For example, from the above JetBlue® example, for two validated messages associated with the candidate template arising from the identification of text stating: "Check In to your flight", there will be differences between the messages despite originating from the same domain and utilizing the same automatic generation process. For example, message 1 states "Check In to you flight LAX to EWR", whereas message 2 states "Check In to your flight AUS to BNA." Therefore, the regular expression, as discussed above is "Check In to your flight", and the wild card text is the text that follows the regular expression. Specifically, the wild cards can be identified as "LAX", "EWR", "AUS" and "BNA." Indeed, while the message template is the same for each message, the specifics of each message may change, as in this example where each message's flight itinerary relayed different flight information, but still maintained the same format and structure.

In another example, two messages contain text in the body of the message that state: "your order of X" and "your order of Y". Therefore, from the above discussion, it is known that the expression "your order of" is the regular expression associated with the body of the message, and is formatted within the structural design of the email message. The text "X" and "Y" will then be identified as the wild cards as they differ from each validated message, in that a message having been identified as being sent via the same automatic process still can carry differences in content specific to the context of each message.

In Step 516, for each domain's candidate template(s), a template listing is formed based on the analysis of validated email bodies and the generalization step. This step is performed by a generalization module 408. That is, for each domain, and for each domain's original candidate listing, a validated candidate listing is compiled, which also includes or has associated therewith information regarding types of wild cards utilized in each message, and in some embodiments, locations of such wild cards within such message types.

Step 516 also involves the identification of a type of message that the validated template is associated with. As discussed above, this type determination is based on the regular expression identification and location of each expression in the messages for which the template is identified and validated. This can also enable the systems and methods discussed herein to direct incoming email traffic to specific email folders. Additionally, types of messages can also be tagged to identify to the user the type of message. From the above example, the message can be tagged with a "travel" designation in the user's inbox, or tagged "important" as it indicates a user's travel itinerary. In some embodiments, the extracted data can be used for monetization purposes, where targeted advertisements can be served based upon the data (e.g., content) extracted or identified from such messages, as discussed in more detail below.

As discussed in more detail below, this type determination of the templates enables the application of the formed templates (i.e., validated templates) to be applied to other messages (referred to as "unknown" messages) of the same type (or category). That is, for newly incoming message traffic or messages already received (and indexed) in a user's inbox, each of which that do not have determined associated message templates, the validated candidate listing can be applied to similar types of messages to perform message extraction, as operably performed by the extraction module 316, as discussed below in relation to FIG. 6.

According to some embodiments, Process 500 may be performed without deference to the sending domain, as the compilation of message templates may be associated with a specific type of message (e.g., category of message) or other information associated with or contained in the message. For example, a message template may be created via Process 500 for messages being sent from an array of vendors, where a vender specific validated message template can be formed based on regular expressions (i.e., content and layout information) and wild cards derived from messages from an array of vendors or senders (e.g., Amazon®, eBay®, JCrew®, and the like).

Figure 6:
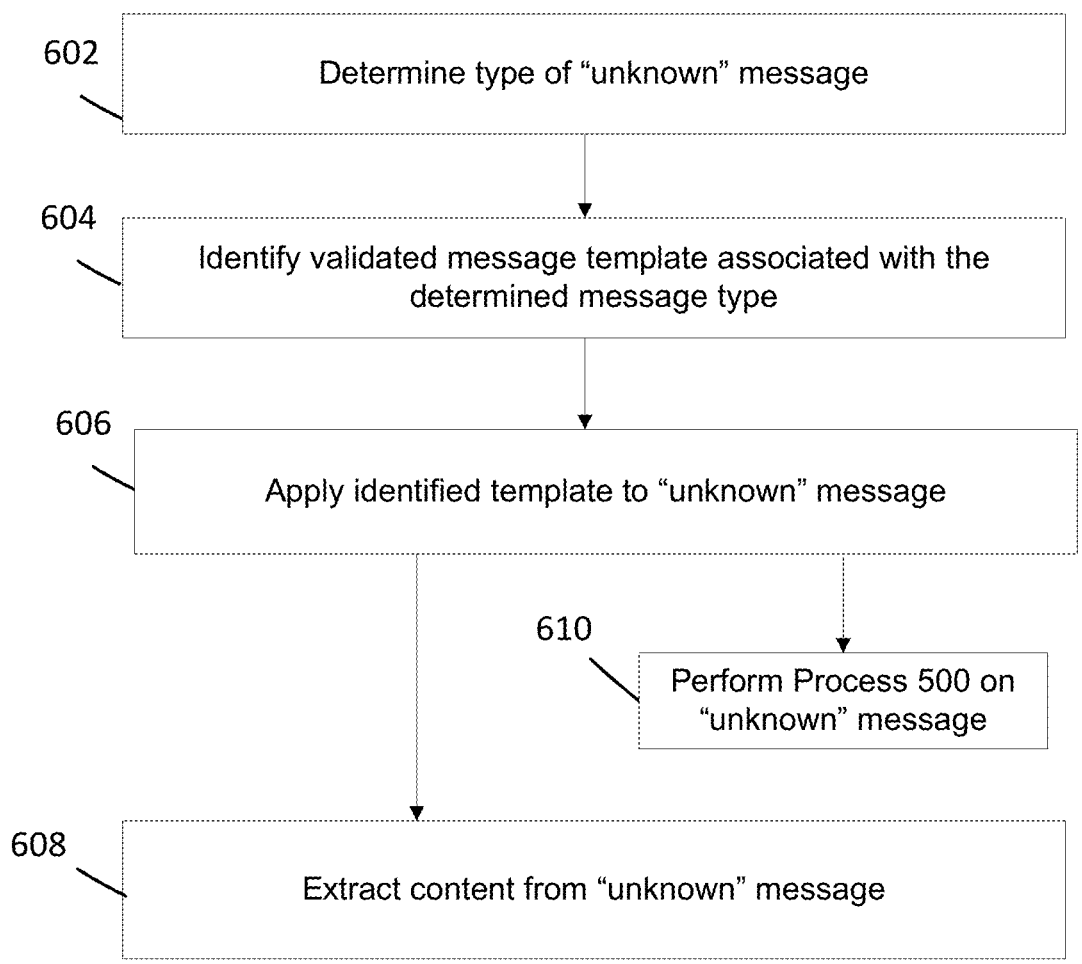
FIG. 6 is a flowchart illustrating steps performed in accordance with some embodiments of the present disclosure.

Turning to FIG. 6, Process 600 leverages the information learned from decoding previously received messages to compile message templates against other messages, such as newly received messages and/or incoming messages, in order to fully, or at least partially decode the information included within such messages. Process 600 relies upon determined message templates, as discussed above; however, Process 600 should not be construed to be limited to the application of the message template determination of Process 500, as any known or to be known template determination process, technique or algorithm is applicable herein. Process 600 discusses the application of determined validated templates from Process 500 to "unknown" messages, and based on this application, data extraction and template/rule extrapolation can be performed.

"Unknown" messages can include newly received messages from senders either not having an associated determined template, or a sender that is utilizing a new or modified template from the one previously analyzed and validated. As such, Process 600 begins in Step 602 where messages are determined to be "unknown" and as a result the "unknown" messages are analyzed to determine a type of message. Indeed, Step 6302 involves determining whether a message is "unknown" by determining that the message does not correspond to an established template (from Process 500). Step 602 is performed by the determination module 312. In some embodiments, messages that already exist in a user's inbox can be parsed to determine the type of message. In some embodiments, a user's inbox is continuously monitored (or monitored according to a predefined period) for incoming messages, and upon detection (e.g., reception) of a message, the incoming message is analyzed, as discussed herein.

The determination of the type of message can be based on the data and metadata comprised within or associated with the message. That is, the message can be analyzed and parsed to determine, for example, and not limited to, the sender's address, the content within the body of the message, the subject line of the message, the temporal or spatial information associated with the message, and the like.

For example, in connection with Step 602, user Bob's mailbox is analyzed to determine the type of "unknown" messages in his inbox. Bob received an email from Amazon® in connection with a purchase he recently made. The determination that the email is associated with a purchase order can be based upon the identification of the sender's address and/or the instance of the email containing product information. As discussed above, this determination is effectuated by parsing the "unknown" message to identify information that indicates the type of message.

Indeed, the type of message determination can be based on regular expression identification in a predetermined portion of a message. For example, user Bob receives an email message from JetBlue® corresponding to a flight itinerary, and as with such messages, the subject line of the message typically denotes the departing and arriving airport codes. Thus, upon analyzing a message from United Airlines®, which for purposes of this example is an "unknown message," the identification of airport codes in the subject line leads to the determination that the message is of a type associated with a flight itinerary.

Continuing with Process 600, Step 604 involves identifying the validated template that corresponds to the determined type of "unknown" message. That is, after the "unknown" message is analyzed and the type of the "unknown" message is determined, a search is performed on the validated templates (from Step 516) to identify the template that corresponds to identified "unknown" message type. In Step 606, the identified template is applied to the "unknown" message. Steps 604-606 are performed by the comparison module 314. Step 606 effectuates the extraction of content from the "unknown" message, as discussed below. Step 608, which is performed by the extraction module 316. Additionally, Step 606 results in the creation of a new validated template (or rule) for the "unknown" message in accordance with Process 500, as discussed above. Step 610, which is performed by the detection module 310.

Turning back to Step 608, an identified validated candidate template can be applied to "unknown" messages in order to effectuate data extraction from the "unknown" message, as operably performed by the extraction module 316. That is, for an incoming message from an unknown domain (e.g., a sender domain not having a determined template), the identified type/category specific validated candidate template is applied to that message, and based on this application, data extraction occurs. Such data extraction is applied to the email format identified via the validation process of the email bodies extracted from the array of message. Additionally, the data extraction also accounts for the wild cards determined in the generalization step, where information regarding such wild cards and/or their locations within message bodies is applied or utilized in extracting message content from incoming messages.

By way of another non-limiting example, from above example regarding JetBlue®, process 500 has compiled a validated candidate template for emails from JetBlue® regarding "Checking In" to a flight. Thus, the format and structure of such emails has been identified (and verified). Additionally, via the generalization step, wild cards, their usage and location of such usage within such email messages (or within such layouts) have also been identified. As discussed above, this information is associated with the validated candidate template (in storage on the content provider or email server, or in an associated database accessible to either or both service providing servers). Therefore, upon receiving another message for "Checking In" from JetBlue®, the validated candidate template for "Checking In" for a JetBlue® originated message is applied.

Additionally, in connection with Process 600, upon receiving a message from another airline, e.g., Southwest®, the validated candidate template for "Checking In" can also be applied. That is, when the Southwest® message is received, it is analyzed and determined to be a type associated with airline messages. Based on this type determination, a search is performed in connection with compiled message templates, and the message template that corresponds to airline messages is identified. This identified template is then applied to the Southwest® message, whereby relevant information can be extracted. As such, the extraction of message content based on the JetBlue® template (and associated wild cards), not only can a new template be created for Southwest® messages, but information of high relevance to the user can be compiled, which from this example, can include a travel itinerary.

According to some embodiments, based on the extracted information, the incoming messages can be organized or categorized, or applied predetermined significance in a user's inbox, and the like. That is, the systems and methods discussed herein can direct the incoming "unknown" email traffic to specific email folders. Additionally, such messages can also be tagged to identify to the user the type of message. From the above example, the Southwest® (and JetBlue®) message can be tagged with a "travel" designation in the user's inbox, or tagged "important" as it indicates a user's travel itinerary. In some embodiments, the extracted data can be used for monetization purposes, where targeted advertisements can be served based upon the data (e.g., content) extracted or identified from such messages, as discussed in more detail below in connection with FIG. 7.

By way of yet another non-limiting example, a message template exists for messages from online vendor: Amazon®. As such, when user Bob receives a message from vendor eBay®, the template associated with Amazon® can be applied based on the determination that both messages are of a same type of message—i.e., they are emails providing a user with information related to a product purchase from an online vendor or merchant.

Figure 7:
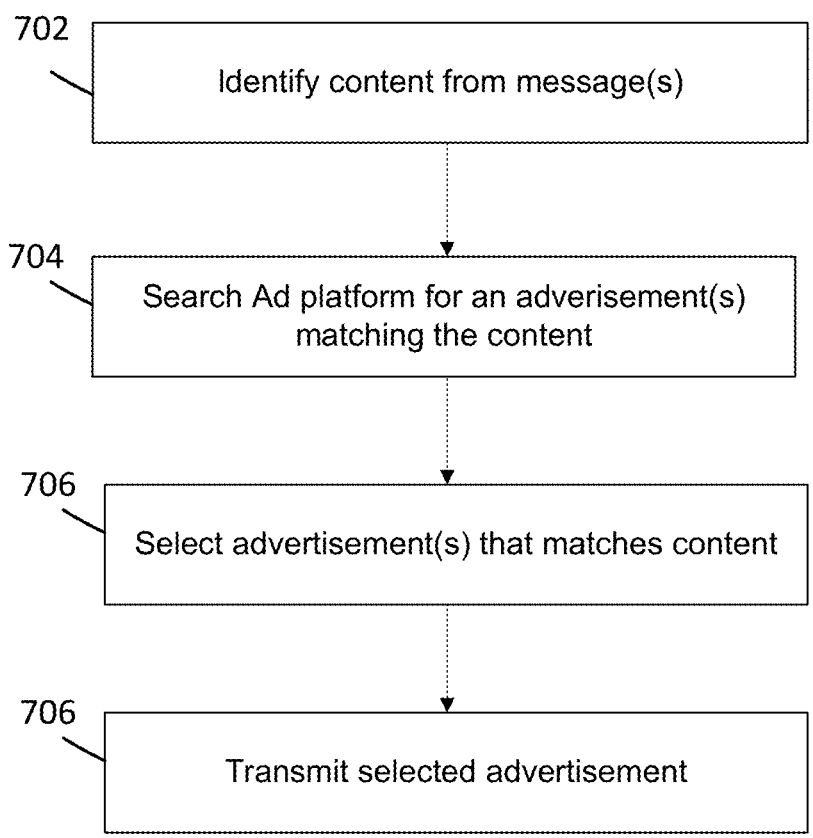
FIG. 7 is a flowchart illustrating steps performed in accordance with some embodiments of the present disclosure.

FIG. 7 is a work flow 700 of serving relevant advertisements based on the extracted data from analyzed messages. Specifically, FIG. 7 illustrates how advertisements are served to a recipients of messages based on the specific content extracted from the messages directed to a recipient. In Step 502, content extracted from a message is identified. That is, as discussed above, content extracted from messages is compiled, as in Step 316, and this content, forms a basis for a context for serving advertisements having a similar context. In Step 704, the content (or content data) is communicated (or shared) from the email platform to an advertisement platform, which comprise an ad server 130 and associated ad database. Upon receipt of the content data, the advertisement server 130 performs a search for a relevant advertisement within the associated advertisement database. The search for an advertisement is based at least on the extracted content.

In Step 704, the advertisement server 130 searches the advertisement database for advertisements that match the identified (and extracted) content. In Step 706, an advertisement is selected (or retrieved) based on the results of Step 704. In some embodiments, the advertisement can be selected based upon the result of Step 704, and modified to conform to attributes of the page or inbox upon which the advertisement will be displayed, and/or to the device for which it will be displayed. In some embodiments, as in Step 708, the selected advertisement is shared or communicated via the email platform. In some alternative embodiments, the selected advertisement is sent directly to each user's computing device.

For example, from the above JetBlue®/Southwest® example, the extracted data from the Southwest® message relates to a user's travel itinerary. Therefore the ads can be selected to provide advertisements or promotions for deals in the identified destination city, or ads for future airline discounts/deals for JetBlue®/Southwest®, for example.

In another example, from the above Amazon®/eBay® example, the extracted data from the eBay® message relates towards a user's purchased product. Therefore, ads can be selected to provide coupons or promotions for deals corresponding to the identified product. For example, if the eBay® message provided product information for a lawnmower, ads can be selected for communication to the user which relate to lawn care.

As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    identifying, via a computing device, a first message associated with an inbox of a user;
    identifying, via the computing device, based on an identifier of the user, a known message template associated with said inbox, said known message template comprising information indicating a message layout of known messages;
    analyzing, via the computing device, said first message, and based on said analysis, identifying message data;
    comparing, via the computing device, the message data with said known message template;
    determining, via the computing device, based on said comparison of the message data with the known message template, that said first message is an unknown message based on said comparison, said determination comprising identifying that said first message comprises a layout that differs from the message template by a threshold degree;
    generating, via the computing device, a new message template based on said message data, said new message template comprising a layout of said first message;
    storing, via the computing device, said new message template;
    receiving, by the computing device, a second message;
    comparing, by the computing device, said second message to said known message template and said new message template;
    identifying, by the computing device, one of the known message template and said new message template based on said comparison of the second message to said known message template and said new message template;

extracting, by the computing device, message content from said second message based on said identified message template; and comparing, by the computing device, said extracted message content to message data of the known message template and providing an indication whether said second message is received from a same domain as the first message or an originating message of the known message template.

2. The method of claim 1, further comprising:
receiving a third message; and
controlling how said third message is displayed within said inbox based on said extracted message content.

3. The method of claim 1, wherein said comparison of said second message to said known message template and said new message template is based on said indication.

4. The method of claim 1, wherein a message layout of the known message template comprises message data including information selected from a group consisting of structural design information, pattern information, a user name, email address, phone number, address, product information, vendor information, a subject line, temporal information and spatial information.

5. The method of claim 1, wherein the known message template is associated with a specific sender, a message layout of the known message template derived from a set of messages determined to have a consistent layout from said specific sender.

6. The method of claim 1, wherein said first message is an automatic message sent by a sender providing digital content or services to said user.

7. The method of claim 1, wherein said first message is an incoming message addressed to the user's inbox.

8. The method of claim 1, wherein said first message is a previously received message in the user inbox.

9. The method of claim 1, further comprising:
identifying a plurality of messages associated with said inbox, wherein said generation of the new message template is based on each of the plurality of messages.

10. A non-transitory computer-readable storage medium tangibly encoded with computer-executable instructions, that when executed by a computing device, perform a method comprising:
identifying, via the computing device, a first message associated with an inbox of a user;
identifying, via the computing device, based on an identifier of the user, a known message template associated with said inbox, said known message template comprising information indicating a message layout of known messages;
analyzing, via the computing device, said first message, and based on said analysis, identifying message data;
comparing, via the computing device, the message data with said known message template;
determining, via the computing device, based on said comparison of the message data with the known message template, that said first message is an unknown message based on said comparison, said determination comprising identifying that said first message comprises a layout that differs from the message template by a threshold degree;
generating, via the computing device, a new message template based on said message data, said new message template comprising a layout of said first message;
storing, via the computing device, said new message template;
receiving, by the computing device, a second message;

comparing, by the computing device, said second message to said known message template and said new message template;
identifying, by the computing device, one of the known message template and said new message template based on said comparison of the second message to said known message template and said new message template;
extracting, by the computing device, message content from said second message based on said identified message template; and
comparing, by the computing device, said extracted message content to message data of the known message template and providing an indication whether said second message is received from a same domain as the first message or an originating message of the known message template.

11. The non-transitory computer-readable storage medium of claim 10, further comprising:
receiving a third message; and
controlling how said third message is displayed within said inbox based on said extracted message content.

12. The non-transitory computer-readable storage medium of claim 10, wherein said comparison of said second message to said known message template and said new message template is based on said indication.

13. The non-transitory computer-readable storage medium of claim 10, wherein a message layout of the known message template comprises message data including information selected from a group consisting of structural design information, pattern information, a user name, email address, phone number, address, product information, vendor information, a subject line, temporal information and spatial information.

14. The non-transitory computer-readable storage medium of claim 10, wherein the known message template is associated with a specific sender, the message layout of the known message template derived from a set of messages determined to have a consistent layout from said specific sender.

15. A computing device comprising:
a processor; and
a non-transitory computer-readable storage medium for tangibly storing thereon program logic for execution by the processor, the program logic comprising:
logic executed by the processor for identifying, via the computing device, a first message associated with an inbox of a user;
logic executed by the processor for identifying, via the computing device, based on an identifier of the user, a known message template associated with said inbox, said known message template comprising information indicating a message layout of known messages;
logic executed by the processor for analyzing, via the computing device, said first message, and based on said analysis, identifying message data;
logic executed by the processor for comparing, via the computing device, the message data with said known message template;
logic executed by the processor for determining, via the computing device, based on said comparison of the message data with the known message template, that said first message is an unknown message based on said comparison, said determination comprising identifying that said first message comprises a layout that differs from the message template by a threshold degree;

logic executed by the processor for generating, via the computing device, a new message template based on said message data, said new message template comprising a layout of said first message;

logic executed by the processor for storing, via the computing device, said new message template;

logic executed by the processor for receiving, via the computing device, a second message;

logic executed by the processor for comparing, via the computing device, said second message to said known message template and said new message template;

logic executed by the processor for identifying, via the computing device, one of the known message template and said new message template based on said comparison of the second message to said known message template and said new message template;

logic executed by the processor for extracting, via the computing device, message content from said second message based on said identified message template; and logic executed by the processor for comparing, via the computing device, said extracted message content to message data of the known message template and providing an indication whether said second message is received from a same domain as the first message or an originating message of the known message template.

16. The computing device of claim 15, further comprising:

logic executed by the processor for receiving a third message; and logic executed by the processor for controlling how said third message is displayed within said inbox based on said extracted message content.

* * * * *